United States Patent
Pan

(10) Patent No.: US 11,124,122 B2
(45) Date of Patent: Sep. 21, 2021

(54) METHOD AND DEVICE FOR CONTROLLING VEHICLE STEERING, VEHICLE-MOUNTED CONTROLLER AND VEHICLE

(71) Applicants: Global Media Industry Group Co., Ltd., Guangdong (CN); Lei Pan, Shenzhen (CN)

(72) Inventor: Lei Pan, Shenzhen (CN)

(73) Assignees: Global Media Industry Group Co., Ltd., Shenzhen (CN); Lei Pan, Shenzhen (CN)

(*) Notice: Subject to any disclaimer, the term of this patent is extended or adjusted under 35 U.S.C. 154(b) by 0 days.

(21) Appl. No.: 16/310,801

(22) PCT Filed: Mar. 22, 2018

(86) PCT No.: PCT/CN2018/079986
§ 371 (c)(1),
(2) Date: Dec. 17, 2018

(87) PCT Pub. No.: WO2019/169669
PCT Pub. Date: Sep. 12, 2019

(65) Prior Publication Data
US 2021/0221294 A1    Jul. 22, 2021

(30) Foreign Application Priority Data
Mar. 9, 2018  (CN) ......................... 201810198039.7

(51) Int. Cl.
*B60R 11/04* (2006.01)
*B60R 1/12* (2006.01)
*B60Q 1/34* (2006.01)

(52) U.S. Cl.
CPC .................. *B60R 1/12* (2013.01); *B60Q 1/34* (2013.01); *B60R 2001/1253* (2013.01);
(Continued)

(58) Field of Classification Search
CPC .................. B60R 1/12; B60R 2300/70; B60R 2001/1253; B60R 2300/8026; B60R 2300/105; B60Q 1/34
See application file for complete search history.

(56) References Cited

U.S. PATENT DOCUMENTS

| 10,974,765 B2* | 4/2021 | Kim ................... B62D 15/0285 |
| 2005/0134447 A1* | 6/2005 | Su ........................... B60Q 1/44 340/463 |

(Continued)

FOREIGN PATENT DOCUMENTS

| CN | 101513856 A | 8/2009 |
| CN | 103552505 A | 2/2014 |

(Continued)

OTHER PUBLICATIONS

International Search Report and Written Opinion of the International Searching Authority for International Application No. PCT/CN2018/079986, dated Sep. 30, 2018, in 9 pages.

*Primary Examiner* — Howard D Brown, Jr.

(57) ABSTRACT

A method and a device for controlling vehicle steering, a vehicle-mounted controller and a vehicle thereof are provided. The vehicle-mounted controller includes: detection module, image acquisition module, and display module; the detection module is provided at rubber hoses located between a left and right vehicle doors and the vehicle body, and is configured to detect whether an electrical signal is present in the rubber hose, which is energized when turn signal lamp in the vehicle is activated. The method includes: receiving the electrical signal detected by the detection module; determining the current turning direction of the vehicle after receiving the electrical signal; controlling the image acquisition module to acquire an image for the rear of the vehicle in the current turning direction, and sending the image acquired to the display module, so as to display the (Continued)

image for the rear of the vehicle in the current turning direction.

17 Claims, 2 Drawing Sheets

(52) U.S. Cl.
CPC ..... *B60R 2300/105* (2013.01); *B60R 2300/70* (2013.01); *B60R 2300/8026* (2013.01)

(56) References Cited

U.S. PATENT DOCUMENTS

| | | | | |
|---|---|---|---|---|
| 2008/0156572 | A1* | 7/2008 | Kasahara | F16D 41/088 |
| | | | | 180/402 |
| 2016/0193997 | A1* | 7/2016 | Yellambalase | B60W 30/08 |
| | | | | 701/36 |
| 2016/0193998 | A1* | 7/2016 | Yellambalase | B60W 50/14 |
| | | | | 348/148 |
| 2017/0210282 | A1* | 7/2017 | Rodriguez Barros | B60Q 1/484 |

FOREIGN PATENT DOCUMENTS

| | | |
|---|---|---|
| CN | 103754173 A | 4/2014 |
| JP | 5559729 B2 | 7/2014 |

* cited by examiner

METHOD AND DEVICE FOR CONTROLLING VEHICLE STEERING, VEHICLE-MOUNTED CONTROLLER AND VEHICLE

CROSS-REFERENCE TO RELATED APPLICATIONS

This application is the U.S. National Phase under 35 U.S.C. § 371 of International Application PCT/CN2018/079986, filed Mar. 22, 2018, which claims priority to CN Application No. 201810198039.7, filed Mar. 9, 2018.

TECHNICAL FIELD

The present disclosure relates to the field of vehicle technology, and particularly to a method and a device for controlling vehicle steering, a vehicle-mounted controller and a vehicle.

BACKGROUND ART

When an automobile is to switch to another lane during the course of running, usually the turn signal lamp is first to be turned on. At this time, an automobile steering control system is required, which controls a display device inside the automobile to display an image for the rear in the direction to which the automobile is to be turned, that is to say, an image for the left rear or the right rear of the vehicle, such that the driver would be aware whether there is an automobile or a pedestrian in the lane of the rear of the vehicle in the corresponding direction.

In the automobile steering control system, a signal for left turn or right turn needs to be firstly obtained. In related technologies, there are roughly two kinds of methods for obtaining this signal. In the first kind of methods, a signal in the bus is decoded through a data port such as CANBUS (ControLLer Area Net-work Bus, a serial bus system) or OBD (On-Board Diagnostic, vehicle mounted diagnostic system), and a signal for left turn or right turn is acquired by decoding. In the second kind of methods, the signal line is to be connected to the car lamp for left or right turn, and the left turn or right turn signal is to be obtained through the signal line.

However, the first kind of methods further requires the purchase of special apparatuses such as decoders and data lines, which would result in the increase of production costs of the automobile steering control system. During the implementation of the second kind of methods, the signal line for left or right turn is usually bound together with other data lines, out of this reason, it takes a relatively long time to find the signal line of the turn signal lamp, which suggests relatively tedious operations.

SUMMARY

In view of this, an object of the present disclosure comprises providing a method and a device for controlling vehicle steering, a vehicle-mounted controller and a vehicle, such that the present disclosure is relatively simple in the aspect of mounting operations, in the meantime there is no need to purchase special apparatuses, such as decoders, which effectively reduces costs.

In a first aspect, an example of the present disclosure provides a method for controlling vehicle steering, which is applied to a vehicle-mounted controller. The vehicle-mounted controller comprises: a detection module, an image acquisition module, and a display module; the detection module is provided at rubber hoses located between a left and right vehicle doors and the vehicle body, and is configured as a detection module for detecting whether an electrical signal is present in the rubber hose, wherein the rubber hose is energized when the turn signal lamp of the vehicle is activated. The method comprises the steps of: receiving the electrical signal detected by the detection module, determining the current turning direction of the vehicle after the reception of the electrical signal detected by the detection module, controlling the image acquisition module to acquire an image for the rear of the vehicle in the current turning direction according to the current turning direction of the vehicle, and sending the image acquired by the image acquisition module to the display module, so as to display the image for the rear of the vehicle in the current turning direction for the driver to check.

In combination with the first aspect, an example of the present disclosure provides a first possible embodiment for the first aspect, wherein the detection module includes a plurality of detectors, with the plurality of detectors being respectively provided at the rubber hoses located between a left and right vehicle doors and the vehicle body; determining the current turning direction of the vehicle after the reception of the electrical signal detected by the detection module, including: determining that the vehicle is currently about to turn left, when a detector provided at the rubber hose located between the left vehicle door and the vehicle body detects an electrical signal, and determining that the vehicle is currently about to turn right, when a detector provided at the rubber hose located between the right vehicle door and the vehicle body detects an electrical signal.

In combination with the first aspect, an example of the present disclosure provides a second possible embodiment for the first aspect, wherein the image acquisition module includes a plurality of cameras, with the plurality of cameras being mounted under the left and right rear-view mirrors of the vehicle respectively, and controlling the image acquisition module to acquire an image for the rear of the vehicle in the current turning direction according to the current turning direction of the vehicle, including: controlling the camera mounted under the left rear-view mirror to acquire an image for the left rear of the vehicle when the vehicle is currently about to turn left, and controlling the camera mounted under the right rear-view mirror to acquire an image for the right rear of the vehicle when the vehicle is currently about to turn right.

In combination with the first aspect, an example of the present disclosure provides a third possible embodiment for the first aspect, wherein after the step of receiving the electrical signal detected by the detection module, the method further comprises the steps of: obtaining the extinction time of the electrical signal; judging whether the extinction time of the electrical signal is longer than a preset time; and controlling the image acquisition module to stop acquiring an image for the rear of the vehicle in the current turning direction, if so, and controlling the display module to shut down.

In a second aspect, an example of the present disclosure further provides a device for controlling vehicle steering, which is applied to a vehicle-mounted controller. The vehicle-mounted controller comprises: a detection module, an image acquisition module, and a display module; the detection module is provided at rubber hoses located between a left and right vehicle doors and the vehicle body, and is configured as a detection module for detecting whether an electrical signal is present in the rubber hose, wherein the rubber hose is energized when the turn signal lamp of the vehicle is activated; the device comprises: a reception module configured to receive the electrical signal detected by the detection module; a determination module configured to determine the current turning direction of the vehicle after the reception of the electrical signal detected by the detection module; a control module configured to control the image acquisition module to acquire an image for the rear of the vehicle in the current turning direction according to the current turning direction of the vehicle; and a transmission module configured to send the image acquired by the image acquisition module to the display module, so as to display the image for the rear of the vehicle in the current turning direction for the driver to check.

In combination with the second aspect, an example of the present disclosure provides a first possible embodiment for the second aspect, wherein the detection module includes a plurality of detectors, with the plurality of detectors being respectively provided at the rubber hoses located between a left and right vehicle doors and the vehicle body, and the determination module is specifically configured to: determine that the vehicle is currently about to turn left, when a detector provided at the rubber hose located between the left vehicle door and the vehicle body detects an electrical signal, and determine that the vehicle is currently about to turn right, when a detector provided at the rubber hose located between the right vehicle door and the vehicle body detects an electrical signal; and the image acquisition module includes a plurality of cameras, with the plurality of cameras being mounted under the left and right rear-view mirrors of the vehicle respectively, and the control module is specifically configured to: control the camera mounted under the left rear-view mirror to acquire an image for the left rear of the vehicle, when the vehicle is currently about to turn left, and control the camera mounted under the right rear-view mirror to acquire an image for the right rear of the vehicle, when the vehicle is currently about to turn right.

In combination with the second aspect, an example of the present disclosure provides a second possible embodiment for the second aspect, wherein it further comprises: an acquisition module and a judgment module, with the acquisition module being respectively in connection with the reception module and the judgment module, and the judgment module being in connection with the control module, wherein the acquisition module is configured to obtain the extinction time of the electrical signal; the judgment module is configured to judge whether the extinction time of the electrical signal is longer than a preset time; and the control module is further configured to control the image acquisition module to stop acquiring an image for the rear of the vehicle in the current turning direction, if the extinction time of the electrical signal is longer than the preset time, and control the display module to shut down.

In a third aspect, an example of the present disclosure further provides a vehicle-mounted controller, comprising: a storage module, a processing module, a detection module, an image acquisition module, and a display module, wherein the processing module is respectively in connection with the storage module, the detection module, the image acquisition module, and the display module; a computer program executable in the processing module is stored in the storage module; the detection module is provided at rubber hoses located between a left and right vehicle doors and the vehicle body and configured to detect whether an electrical signal is present in the rubber hose; wherein the rubber hose is energized when the turn signal lamp of the vehicle is activated; the image acquisition module is configured to receive a control instruction from the processing module, and acquire an image for the rear of the vehicle in the current turning direction according to the control instruction; the display module is configured to display the image for the rear of the vehicle in the current turning direction; and the processing module executes the computer program, hereby realizing the method according to any one of the foregoing examples.

In combination with the third aspect, an example of the present disclosure provides a first possible embodiment for the third aspect, wherein the detection module is provided on the rubber hose in a way of enwinding or clamping.

In a fourth aspect, an example of the present disclosure further provides a vehicle-mounted controller, comprising a display module, a first camera, a second camera, a first detector and a second detector, wherein the first camera is provided under the left rear-view mirror of the vehicle, the second camera is provided under the right rear-view mirror of the vehicle, the first detector is provided at a rubber hose located between a left vehicle door and the vehicle body, and the second detector is provided at a rubber hose located between a right vehicle door and the vehicle body; the first camera, the second camera, the first detector, and the second detector are respectively in electrical connection with the display module;

wherein the rubber hose located between the left vehicle door and the vehicle body is energized when the left turn signal lamp of the vehicle is activated, and the first detector is configured to detect an electrical signal of the rubber hose; and the rubber hose located between the right vehicle door and the vehicle body is energized when the right turn signal lamp of the vehicle is activated, and the second detector is configured to detect an electrical signal of the rubber hose;

the first detector sends the electrical signal to the display module when detecting an electrical signal; and the second detector, when detecting an electrical signal, sends the electrical signal to the display module;

when receiving the electrical signal sent by the first detector, the display module energizes the first camera, controls the first camera to acquire an image for the left rear of the vehicle, and displays the image acquired by the first camera; and when receiving the electrical signal sent by the second detector, the display module energizes the second camera, controls the second camera to acquire an image for the right rear of the vehicle, and displays the image acquired by the second camera.

In combination with the fourth aspect, an example of the present disclosure provides one possible embodiment for the fourth aspect, wherein the display module stops powering the first camera and the second camera, when no electrical signal is received within a preset duration.

In a fifth aspect, an example of the present disclosure further provides a vehicle-mounted controller, comprising a display module, a first camera, a second camera, a first detector and a second detector, wherein the first camera is provided under the left rear-view mirror of the vehicle, the second camera is provided under the right rear-view mirror of the vehicle, the first detector is provided at a rubber hose located between a left vehicle door and the vehicle body, and the second detector is provided at a rubber hose located between a right vehicle door and the vehicle body;

the first camera and the second camera are respectively in electrical connection with the display module; the first detector is in electrical connection with the first camera, and the second detector is in electrical connection with the second camera;

wherein the rubber hose located between the left vehicle door and the vehicle body is energized when the left turn signal lamp of the vehicle is activated, and the first detector is configured to detect an electrical signal of the rubber hose; and when the right turn signal lamp of the vehicle is activated, the rubber hose located between the right vehicle door and the vehicle body is energized, and the second detector is configured to detect an electrical signal of the rubber hose;

the first detector, when detecting an electrical signal, sends the electrical signal to the first camera; the first camera, when receiving the electrical signal sent by the first detector, acquires an image for the left rear of the vehicle and sends the acquired image to the display module; and the second detector, when detecting an electrical signal, sends the electrical signal to the second camera; and the second camera, when receiving the electrical signal sent by the second detector, acquires an image for the right rear of the vehicle and sends the acquired image to the display module.

In combination with the fifth aspect, an example of the present disclosure provides one possible embodiment for the fifth aspect, wherein the first camera stops acquiring an image, when no electrical signal is received within a preset duration; and the second camera stops acquiring an image, when no electrical signal is received within a preset duration.

In combination with the fifth aspect, an example of the present disclosure provides one possible embodiment for the fifth aspect, wherein the display module is automatically activated, when a video signal is detected, and displays the image corresponding to the video signal; and the display module is automatically shut down, when no video signal is detected within the preset duration.

In a sixth aspect, an example of the present disclosure further provides a vehicle, comprising: turn signal lamps, rubber hoses located between a left and right vehicle doors and the vehicle body, and a vehicle-mounted controller, wherein the rubber hose is energized, when the turn signal lamp is activated; and the vehicle-mounted controller is a vehicle-mounted controller according to the foregoing examples.

The examples of the present disclosure bring the following beneficial effects: through the provision of detection module at rubber hoses located between a left and right vehicle doors and the vehicle body, the activation and shut-down of a turn signal lamp is detected by detecting whether the electrical signal is present when the rubber hose is energized; and after the reception of the electrical signal, the current turning direction is determined, the image acquisition module is controlled to acquire an image for the rear of the vehicle in the current turning direction, and the corresponding image for the rear of the vehicle in the current turning direction is sent to the display module, hereby realizing the function of assisting in steering. As a rubber hose is easy to be found, it is enabled the operation of the present disclosure relatively simple when mounting into a vehicle; in the meantime, there is no need to purchase special apparatuses such as decoders, which effectively reduces costs.

Other features and advantages of the present disclosure will be described in the subsequent description, and partially becomes obvious from the description or would be understood by implementing the present disclosure. The objects and other advantages of the present disclosure will be realized and obtained through a structure specifically indicated in the description, in the claims and in the drawings.

In order to make the above-mentioned objects, features and advantages of the present disclosure more obvious and easier to be understood, preferred examples will be specifically illustrated and described in detail below with reference to the appending drawings.

BRIEF DESCRIPTION OF THE DRAWINGS

In order to more clearly describe the technical solutions of the specific embodiments of the present disclosure or in the prior art, the figures required to be used in the description of the specific embodiments or the prior art will be briefly presented below. Obviously, the figures described below show certain embodiments of the present disclosure, and for a person ordinarily skilled in the art, other figures could be obtained according to these figures without inventive efforts.

Reference signs: 400—vehicle-mounted controller; 410—detection module; 420—image acquisition module; 430—display module; 440—processing module; 450—storage module; 300—device for controlling vehicle steering; 310—reception module; 320—determination module; 330—control module; and 340—transmission module.

DETAILED DESCRIPTION OF THE EMBODIMENTS

In order to make the objects, the technical solutions and the advantages of the examples of the present disclosure much clearer, the technical solutions of the present disclosure will be clearly and comprehensively described below in combination with the appending drawing. Obviously, the described embodiments are merely some of the embodiments of the present disclosure, but not all the embodiments. All other embodiments, obtained by a person ordinarily skilled in the art without inventive efforts based on the embodiments in the present disclosure, shall fall within the scope of protection of the present disclosure.

As existing methods for controlling steering require purchasing special apparatuses such as decoders and data lines, it would result in the increase of production costs of automobile steering control system. Moreover, it would also result in relatively tedious operations. On this basis, the embodiments of the present disclosure provide a method and a device for controlling vehicle steering, a vehicle-mounted controller, and a vehicle, and the method for controlling vehicle steering according to the present disclosure is firstly introduced below in detail.

Embodiment I

Figure 4:
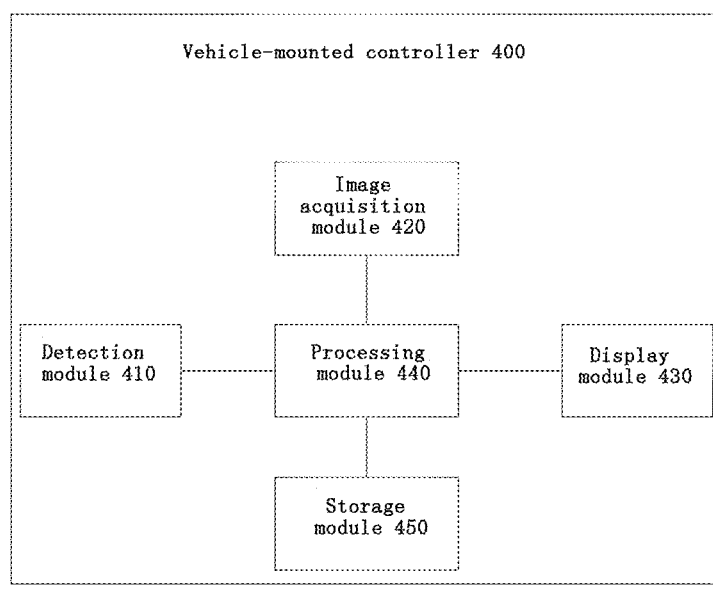
FIG. 4 is a structure chart of a vehicle-mounted controller provided in a third example of the present disclosure.

In order to facilitate the understanding of the present embodiment, it is firstly introduced that the method disclosed in the present disclosure is applied to a vehicle-mounted controller. As shown in FIG. 4, it is a vehicle-mounted controller 400 provided in an embodiment of the present disclosure. This vehicle-mounted controller 400 includes: a detection module 410, an image acquisition module 420, and a display module 430; wherein the detection module 410 is provided at rubber hoses located between a left and right vehicle doors and the vehicle body, and is configured as a detection module for detecting whether an electrical signal is present in the rubber hose, wherein the rubber hose is energized when the turn signal lamp of the vehicle is activated. When the rubber hose is energized, the detection module 410 can detect that the rubber hose is energized, that is to say, it can detect the activation of the turn signal lamp.

Figure 1:
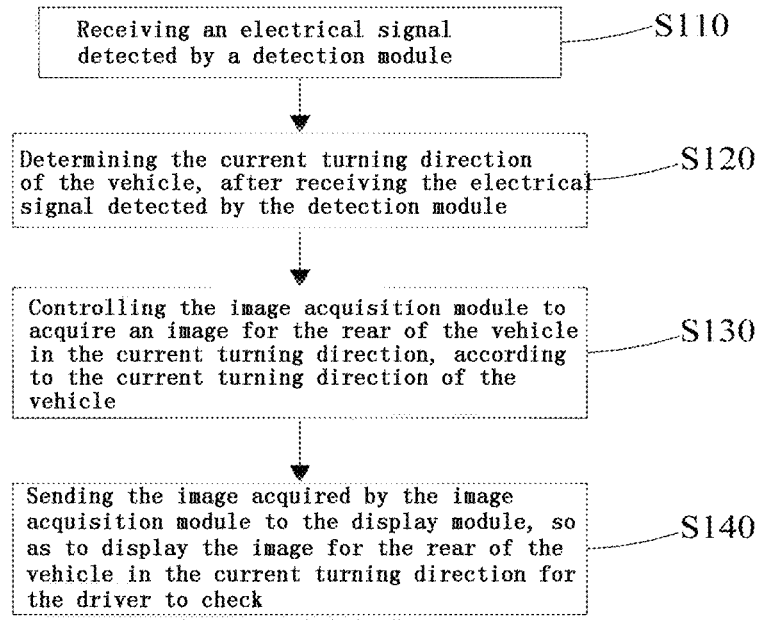
FIG. 1 is a flow chart of a method for controlling vehicle steering provided in a first example of the present disclosure.

Referring to FIG. 1, the method for controlling vehicle steering disclosed in the embodiment of the present disclosure comprises the steps of:

S110: receiving the electrical signal detected by the detection module.

Optionally, the detection module 410 can be provided at a rubber hose, and in this way, when the rubber module is energized, the detection module 410 can then detect the energizing condition of the rubber hose, that is to say, it detects the activation of the turn signal lamp of the vehicle; in the meantime, the vehicle-mounted controller can be in connection with the detection module 410, and when the detection module 410 detects an electrical signal, the vehicle-mounted controller can receive the electrical signal detected by the detection module 410. Optionally, the detection module 410 can be provided on the rubber hose in a way of enwinding or clamping. As the rubber hose located between a vehicle door and the vehicle body is easy to be found, the detection module 410 can be extremely conveniently mounted, making the actual operations in the present disclosure much simpler.

S120: determining the current turning direction of the vehicle, after the reception of the electrical signal detected by the detection module.

Optionally, the current turning direction of the vehicle can be determined according to the source of the electrical signal, after the reception of the electrical signal detected by the detection module 410.

In some optional embodiments, the detection module 410 includes a plurality of detectors, with the plurality of detectors being respectively provided at the rubber hose located between a left and right vehicle doors and the vehicle body. Among these, determining the current turning direction of the vehicle after the reception of the electrical signal detected by the detection module includes: determining that the vehicle is currently about to turn left, when a detector provided at the rubber hose located between the left vehicle door and the vehicle body detects an electrical signal; and determining that the vehicle is currently about to turn right, when a detector provided at the rubber hose located between the right vehicle door and the vehicle body detects an electrical signal.

Optionally, the rubber hose located between the left vehicle door and the vehicle body is powered, when the vehicle sends a turn signal about turning left, and at this time, the detector provided at the rubber hose located between the left vehicle door and the vehicle body can detect an electrical signal, then the detector provided at the rubber hose located between the left vehicle door and the vehicle body can send the detection signal to the vehicle-mounted controller 400, and the vehicle-mounted controller 400 can determine left-turn as current turning direction of the vehicle after the reception of the electrical signal detected by the detection device provided at the rubber hose located between the left vehicle door and the vehicle body. Similarly, when the detector provided at the rubber hose located between the right vehicle door and the vehicle body sends the detection signal to the vehicle-mounted controller 400, the vehicle-mounted controller 400 can determine right-turn as the current turning direction of the vehicle after the reception of the electrical signal detected by the detector provided at the rubber hose located between the right vehicle door and the vehicle body.

S130: controlling the image acquisition module to acquire an image for the rear of the vehicle in the current turning direction, according to the current turning direction of the vehicle.

Optionally, in the present embodiment, the image acquisition module 420 can include a plurality of cameras, wherein the plurality of cameras are mounted under the left and right rear-view mirrors of the vehicle respectively, and when the current turning direction of the vehicle is left-turn, the camera mounted under the left rear-view mirror is controlled to acquire an image for the left rear of the vehicle, so as to assist the driver in steering. Correspondingly, when the current turning direction of the vehicle is right-turn, the camera mounted under the right rear-view mirror is controlled to acquire an image for the right rear of the vehicle, so as to assist the driver in steering.

S140: sending the image acquired by the image acquisition module to the display module, so as to display the image for the rear of the vehicle in the current turning direction for the driver to check.

Optionally, the vehicle-mounted controller 400 can be in connection with the image acquisition module 420, and the image acquisition module 420 is in connection with the display module 430; and in a situation of left-turn, after the vehicle-mounted controller 400 controls the image acquisition module 420 to acquire an image for the left rear of the vehicle, the camera located at the left side is controlled to send the acquired image to the display module 430. Similarly, in a situation of right-turn, after the vehicle-mounted controller 400 controls the image acquisition module 420 to acquire an image for the right rear of the vehicle, the camera located at the right side is controlled to send the acquired image to the display module 430.

Optionally, in the case that the image acquisition module 420 is not in connection with the display module 430, the image acquisition module 420 can firstly send the acquired image to the vehicle-mounted controller 400, which then sends the image to the display module 430, so as to realize the display of the image for the rear of the vehicle in the current turning direction for the driver to check.

Optionally, in the present embodiment, the display module 430 can be automatically activated, when a video signal is detected, and display.

Through the foregoing embodiments, the beneficial effects brought by the present disclosure are as follows: among these, the rubber hose located between a vehicle door and the vehicle body is energized, when the turn signal lamp is activated; if a detection module mounted in the vehicle, it detects whether the turn signal lamp is electrically charged through the rubber hose located between a vehicle door and the vehicle body; and as the rubber hose located between a vehicle door and the vehicle body is easy to be found, the operations in the present disclosure are made much simpler, the current turning direction is then determined, an image for the rear of the vehicle in the current turning direction is acquired by controlling the image acquisition module, and the corresponding image for the rear of the vehicle in the current turning direction is sent to the display module, hereby realizing the display of the image for the rear of the vehicle in the current turning direction for the driver to check. In this way, the present disclosure can not only realize the auxiliary function for steering, but also enable the auxiliary function to be mounted in a vehicle with relatively simple operations and less cost.

Among these, the display module 430 can include a display screen, which can be a display screen for rear-view mirror in the vehicle or DVD navigation.

Figure 2:
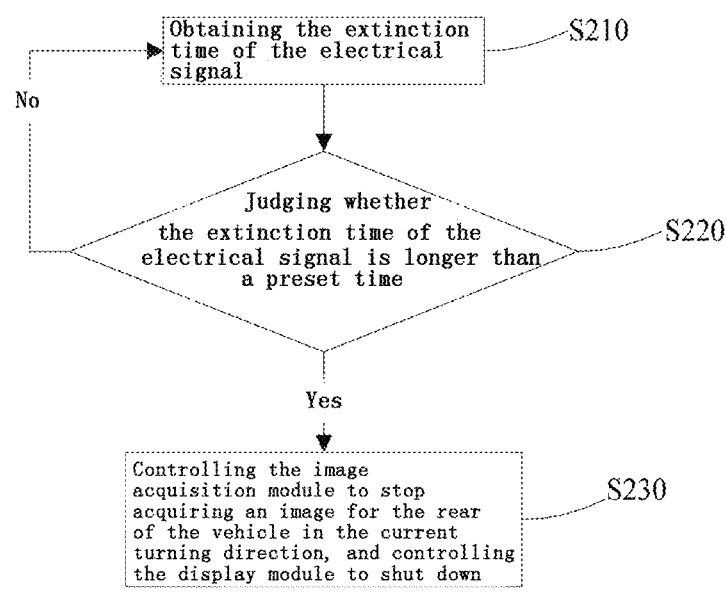
FIG. 2 is a flow chart of a control method at the end of vehicle steering provided in an example of the present disclosure.

In some optional embodiments, in combination with FIG. 2, after the step of receiving the electrical signal detected by the detection module, the method can further includes the steps of:

S210: obtaining the extinction time of the electrical signal;

S220: judging whether the extinction time of the electrical signal is longer than a preset time, and executing S230, if so, or returning back to S210 if not; and S230: controlling the image acquisition module to stop acquiring an image for the rear of the vehicle in the current turning direction, and controlling the display module to shut down.

Optionally, when the steering course is over, the quantity of electricity on the rubber hose located between the vehicle door and the vehicle body will disappear, and the detection module will then not be able to detect an electrical signal. Therefore, in the case of judging whether the steering course is over, it can be aware of the finish of the steering course by obtaining the extinction time of the electrical signal and by judging the extinction time of the electrical signal is longer than a preset time. At this time, the image acquisition module 420 needs to be controlled to stop acquiring an image for the rear of the vehicle in the current turning direction, and the display module 430 is to be controlled to shut down, such that automatic control can be realized from the start of the steering to the end of the steering.

Optionally, the preset time for the extinction of the electrical signal can be set to be any value between 1 second and 5 seconds.

Embodiment II

A second embodiment of the present disclosure provides a device for controlling vehicle steering 300, it is firstly introduced that the device disclosed in the present disclosure is applied to a vehicle-mounted controller, and in combination with FIG. 4, the vehicle-mounted controller 400 comprises: a detection module 410, an image acquisition module 420, and a display module 430; wherein the detection module 410 is provided at rubber hoses located between a left and right vehicle doors and the vehicle body, and is configured as a detection module for detecting whether an electrical signal is present in the rubber hose, wherein the rubber hose is energized when the turn signal lamp of the vehicle is activated. When the rubber hose is energized, the detection module 410 can detect that the rubber hose is energized, that is to say, it can detect the activation of the turn signal lamp. Among these, the present disclosure is specifically applied to the vehicle-mounted controller 400.

Figure 3:
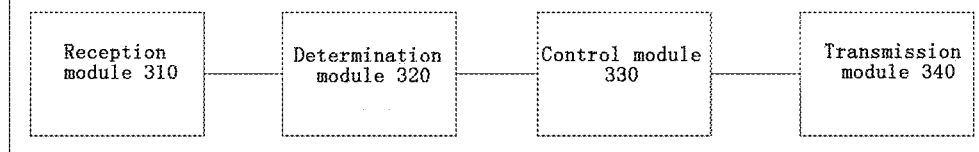
FIG. 3 is a structure chart of a device for controlling vehicle steering provided in a second example of the present disclosure.

In combination with FIG. 3, the device for controlling vehicle steering 300 comprises: a reception module 310, a determination module 320, a control module 330, and a transmission module 340.

Among these, the reception module 310, the determination module 320, the control module 330, and the transmission module 340 are respectively in connection with each other. The reception module 310 is configured to receive the electrical signal detected by the detection module. The determination module 320 is configured to determine the current turning direction of the vehicle after the reception of the electrical signal detected by the detection module. The control module 330 is configured to control the image acquisition module to acquire an image for the rear of the vehicle in the current turning direction according to the current turning direction of the vehicle. The transmission module 340 is configured to send the image acquired by the image acquisition module to the display module, so as to display the image for the rear of the vehicle in the current turning direction for the driver to check.

As for the device provided in the embodiment of the present disclosure, its implementation principle and the technical effects produced thereby are the same as that in the foregoing embodiment of method, and reference can be made to corresponding contents in the preceding method embodiment as for contents that are not mentioned in the part of the device embodiment for the sake of brief description.

In some optional embodiments, the detection module includes a plurality of detectors, with the plurality of detectors being respectively provided at rubber hoses located between a left and right vehicle doors and the vehicle body, and the determination module is specifically configured to: determine that the vehicle is about to turn left, when a detector provided at the rubber hose located between the left vehicle door and the vehicle body detects an electrical signal, and determine that the vehicle is currently about to turn right, when a detector provided at the rubber hose located between the right vehicle door and the vehicle body detects an electrical signal; the image acquisition module includes a plurality of cameras, with the plurality of cameras being mounted under the left and right rear-view mirrors of the vehicle respectively, and the control module is specifically configured to: control the camera mounted under the left rear-view mirror to acquire an image for the left rear of the vehicle, when the vehicle is currently about to turn left, and control the camera mounted under the right rear-view mirror to acquire an image for the right rear of the vehicle, when the vehicle is currently about to turn right.

In some optional embodiments, it further comprises: an acquisition module and a judgment module, with the acquisition module being respectively in connection with the reception module and the judgment module, and the judgment module being in connection with the control module 330, wherein the acquisition module is configured to obtain the extinction time of the electrical signal;

the judgment module is configured to judge whether the extinction time of the electrical signal is longer than a preset time; and the control module 330 is further configured to control the image acquisition module to stop acquiring an image for the rear of the vehicle in the current turning direction, if the extinction time of the electrical signal is longer than the preset time, and control the display module to shut down.

Embodiment III

In combination with FIG. 4, a third embodiment of the present disclosure provides a vehicle-mounted controller 400, comprising: a detection module 410, an image acquisition module 420, a display module 430, a processing module 440, and a storage module 450, wherein the processing module 440 is respectively in connection with the detection module 410, the image acquisition module 420, the display module 430, and the storage module 450;

wherein a computer program executable in the processing module 440 is stored in the storage module 450; the detection module 410 is provided at rubber hoses located between a left and right vehicle doors and the vehicle body and configured to detect whether an electrical signal is present in the rubber hose, wherein the rubber hose is energized, when the turn signal lamp in the vehicle is activated; the image acquisition module 420 is configured to receive a control instruction from the processing module, and acquire an image for the rear of the vehicle in the current turning direction according to the control instruction; the display module 430 is configured to display the image for the rear of the vehicle in the current turning direction; and the processing module 440 executes the computer program, hereby realizing the method according to any one of the foregoing embodiments.

Optionally, the vehicle-mounted controller 400 can receive the electrical signal detected by the detection module 410; determine the current turning direction of the vehicle, after receiving the electrical signal detected by the detection module 410; control the image acquisition module 420 to acquire an image for the rear of the vehicle in the current turning direction according to the current turning direction of the vehicle; and send the image acquired by the image acquisition module 420 to the display module 430, so as to display the image for the rear of the vehicle in the current turning direction for the driver to check. In this way, the function of assisting in steering is realized through the detection module 410 that detects whether the turn signal lamp is electrically charged; moreover, since the detection module 410 is provided at rubber hoses located between a left and right vehicle doors and the vehicle body, and the rubber hose is easy to be found, which enable the operations for mounting the vehicle-mounted controller 400 onto a vehicle relatively simple. Moreover, the steering assistance is completed without the need to purchase special apparatuses, which effectively reduces costs.

In some optional embodiments, the detection module 410 is provided on the rubber hose in a way of enwinding or clamping.

In some optional embodiments, the detection module 410 can be a current sensor.

In some optional embodiments, the image acquisition module 420 can include a plurality of cameras, with the plurality of cameras being respectively mounted under the rear-view mirrors of the vehicle.

Among these, a vehicle-mounted controller 400 provided in an embodiment of the present disclosure further comprises: a bus and a communication interface, wherein the processing module 440, the communication interface, and the storage module 450 are in connection through the bus.

Herein, the storage module 450 may include a high speed RAM (Random Access Memory), and also may further include a non-volatile memory, e.g. at least one magnetic disk memory. The communication connection between the system network element and at least one of other network elements is realized by at least one communication interface (which may be wired or wireless), and either Internet, or wide area network, or local network, or metropolitan area network or the like may be used.

The bus can be an ISA bus, a PCI bus, or an EISA bus or the like. The bus can be divided into an address bus, a data bus, a control bus and the like.

Herein, the storage module 450 is configured to store a program, and the processing module 440 executes the program after receiving the execution instruction, and the method executed by the device defined by the flow process disclosed in any of the foregoing embodiments of the present disclosure may be applied to the processing module 440 or be implemented by the processing module 440.

The processing module 440 may be an integrated circuit chip having a capacity of processing signals. During the implementation, the respective steps of the above method can be accomplished through an integrated logic circuit of the hardware or an instruction in form of software in the processing module 440. The above processing module 440 can be a universal processor, including a Central Processing Unit (CPU), a Network Processor (NP) and the like; it may also be a Digital Signal Processor (DSP), an Application Specific Integrated Circuit (ASIC), a Field-Programmable Gate Array (FPGA) or other programmable logic devices, a discrete gate or a transistor logic device, a discrete hardware component. The respective methods, steps, and logic block diagrams disclosed in the embodiments of the present disclosure can be implemented or executed. The universal processor may be a microprocessor, or the processor may also be any conventional processor or the like. In combination with the steps of the method disclosed in the embodiments of the present disclosure, it may be directly embodied in a way of being executed and completed by the hardware of a decoding processor, or being executed and completed by a combination of hardware and software modules in the decoding processor. The software module can be located in a developed storage medium in the art such as random access memory, flash memory, read only memory, programmable read only memory or electrically erasable programmable memory, register and the like. The storage medium is located in the storage module 450, and the processing module 440 reads the information in the storage module 450, and completes the steps of the above method in cooperation with the hardware thereof.

As for the vehicle-mounted controller provided in the embodiment of the present disclosure, its implementation principle and the technical effects produced thereby are the same as that in the foregoing embodiment of method, and for concise description, reference can be made to corresponding contents in the preceding method embodiment as for contents that are not mentioned in the part of the embodiment for the vehicle-mounted controller.

In another vehicle-mounted controller provided in an embodiment of the present disclosure, the vehicle-mounted controller comprises a display module, a first camera, a second camera, a first detector and a second detector, wherein the first camera is provided under the left rear-view mirror of the vehicle, the second camera is provided under the right rear-view mirror of the vehicle, the first detector is provided at a rubber hose located between a left vehicle door and the vehicle body, and the second detector is provided at a rubber hose located between a right vehicle door and the vehicle body. Herein, the rubber hose located between the left vehicle door and the vehicle body is energized, when the left turn signal lamp is activated, and the first detector is configured to detect an electrical signal of the rubber hose; and when the right turn signal lamp is activated, the rubber hose located between the right vehicle door and the vehicle body is energized, and the second detector is configured to detect an electrical signal of the rubber hose.

In one specific embodiment, the first camera, the second camera, the first detector and the second detector are respectively in electrical connection with the display module. Under this situation, the first detector, when detecting an electrical signal, sends the electrical signal to the display module. The second detector, when detecting an electrical signal, sends the electrical signal to the display module. When receiving the electrical signal sent by the first detector, the display module energizes the first camera, controls the first camera to acquire an image for the left rear of the vehicle, and displays the image acquired by the first camera. When receiving the electrical signal sent by the second detector, the display module energizes the second camera, controls the second camera to acquire an image for the right rear of the vehicle, and displays the image acquired by the second camera.

Optionally, the display module can stop powering the first camera and the second camera, when no electrical signal is received within a preset duration. In detail, in a situation where the display module is powering the first camera, the display module will stop powering the first camera, if the display module receives no electrical signal within a preset duration. In a situation where the display module is powering the second camera, the display module will stop powering the second camera, if the display module receives no electrical signal within a preset duration.

In the present embodiment, the preset duration can be flexibly set according to actual situations, e.g. it can be any value between 1 second and 5 seconds.

In further another specific embodiment, the first camera and the second camera are respectively in electrical connection with the display module; and the first detector is in electrical connection with the first camera, and the second detector is in electrical connection with the second camera. Under this situation, the first detector, when detecting an electrical signal, sends the electrical signal to the first camera; and the first camera, when receiving the electrical signal sent by the first detector, acquires an image for the left rear of the vehicle and sends the acquired image to the display module. The second detector, when detecting an electrical signal, sends the electrical signal to the second camera; and the second camera, when receiving the electrical signal sent by the second detector, acquires an image for the right rear of the vehicle and sends the acquired image to the display module.

Optionally, the first camera can stop acquiring an image, when no electrical signal is received within a preset duration. The second camera can stop acquiring an image, when no electrical signal is received within a preset duration.

Optionally, the display module can be automatically activated, when a video signal is detected, and display the image corresponding to the video signal; and the display module can be automatically shut down, when no video signal is detected within the preset duration.

Herein, the images sent to the display module by the first camera and the second camera are all sent in form of a video signal, thus, the display module can just detect a video signal, when the first camera or the second camera sends an image to the display module.

Embodiment IV

A fourth embodiment of the present disclosure provides a vehicle, comprising: turn signal lamps, rubber hoses located between a left and right vehicle doors and the vehicle body, and a vehicle-mounted controller;

wherein the rubber hose located between a vehicle door and the vehicle body is energized, when the turn signal lamp is activated; the vehicle-mounted controller is in connection with the rubber hose; and the vehicle-mounted controller 400 is a vehicle-mounted controller according to any one of the foregoing embodiments.

As for the vehicle provided in the embodiment of the present disclosure, through a detection module provided at rubber hoses located between a left and right vehicle doors and the vehicle body, the activation and shut-down of a turn signal lamp is detected by detecting whether an electrical signal is present in the rubber hose; after receiving the electrical signal, the current turning direction is determined; the image acquisition module is controlled to acquire an image for the rear of the vehicle in the current turning direction, and the corresponding image for the rear of the vehicle in the current turning direction is sent to the display module, hereby realizing the function of assisting in vehicle steering. As a rubber hose is easy to be found, it enables operations for mounting the vehicle-mounted controller onto a vehicle relatively simple; in the meantime, there is no need to purchase special apparatuses such as decoders, which effectively reduces costs.

In addition, other constitutions and functions of the vehicle according to embodiments of the present disclosure would be known for a person ordinarily skilled in the art, and for brief description, no repetitive description will be made.

It shall be noted that similar reference signs and letters represent similar items in the following figures, thus, once a certain item is defined in one figure, no further definition and explanation for this item is necessary in the subsequent figures.

Besides, in the description of the embodiments of the present disclosure, unless otherwise expressly specified and defined, terms such as "connect" and "connection" shall be construed in a broad sense. For example, it may be fixed connection, or detachable connection, or integrated connection; it may be mechanical connection, or electrical connection; or it may be direct connection, or indirect connection via an intermediate, or inner communication between two elements. For a person ordinarily skilled in the art, the specific meanings of the above-mentioned terms in the present disclosure could be construed in accordance with specific circumstances.

In the description of the present disclosure, it is to be clarified that orientations or position relationships indicated by terms such as "central", "upper", "lower", "left", "right", "vertical", "horizontal", "inner", and "outer" are orientations or position relationships based on the figures, merely for the purpose of facilitating the description of the present disclosure and for simplifying the description, rather than indicating or implying that a specified device or element must have a specific orientation, or be constructed and operated in a certain orientation, and therefore cannot be construed as limiting the present disclosure. In addition, terms such as "first", "second", and "third" are used merely for purpose of description, and cannot be construed as indicating or implying relative importance.

At last, it is to be clarified that the above embodiments are merely specific embodiments of the present disclosure, and are used to explain the technical solutions of the present disclosure, rather than limit the same, thus, the scope of protection of the present disclosure is not limited thereto. Although the present disclosure is explained in detail referring to the preceding embodiments, it should be understood for a person ordinarily skilled in the art that any technical person familiar with the present technical field could still make modifications or readily imagined variations to the technical solutions recorded in the preceding embodiments, or substitute a part of the technical features thereof with equivalent, within the technical scope disclosed in the present disclosure. However, these modifications, variations or substitutions do not make the essence of the corresponding technical solutions depart from the spirit and scope of the technical solutions of the embodiments of the present disclosure, and shall all be covered by the scope of protection of the present disclosure. Thus, the scope of protection of the present disclosure shall be defined according to the scope of protection of the claims.

INDUSTRIAL APPLICABILITY

As for the method and the device for controlling vehicle steering, the vehicle-mounted controller, and the vehicle provided in the present disclosure, the detection module is provided at a rubber hose located between a vehicle door and the vehicle body; and as a rubber hose is easy to be found, it is facilitated to mount the vehicle-mounted controller onto a vehicle; in the meantime, there is no need to purchase special apparatuses such as decoders, which effectively reduces costs.

What is claimed is:

1. A method for controlling vehicle steering, wherein the method is applicable to a vehicle-mounted controller, comprising: detection modules, an image acquisition module, and a display module, wherein the detection modules are provided at rubber hoses located between left and right vehicle doors and a vehicle body, and configured as a detection module for detecting whether an electrical signal is present in a rubber hose, wherein the rubber hose is energized when a turn signal lamp of the vehicle is activated, and the method comprises following steps:
receiving the electrical signal detected by the detection module;
determining a current turning direction of the vehicle, after receiving the electrical signal detected by the detection module;
controlling the image acquisition module to acquire an image for rear of the vehicle in the current turning direction, according to the current turning direction of the vehicle; and
sending the image acquired by the image acquisition module to the display module, so as to display the image for the rear of the vehicle in the current turning direction for the driver to check.

2. The method according to claim 1, wherein the detection module comprises a plurality of detectors, with the plurality of detectors being respectively provided at rubber hoses located between left and right vehicle doors and the vehicle body, and after receiving the electrical signal detected by the detection module, the step of determining the current turning direction of the vehicle comprises following steps:
determining that the vehicle is currently about to turn left, when a detector provided at the rubber hose located between the left vehicle door and the vehicle body detects an electrical signal; and
determining that the vehicle is currently about to turn right, when a detector provided at the rubber hose located between the right vehicle door and the vehicle body detects an electrical signal.

3. The method according to claim 2, wherein the image acquisition module comprises a plurality of cameras, with the plurality of cameras being mounted under the left and right rear-view mirrors of the vehicle respectively, and the step of controlling the image acquisition module to acquire an image for the rear of the vehicle in the current turning direction according to the current turning direction of the vehicle comprises following steps:
controlling the camera mounted under the left rear-view mirror to acquire an image for left rear of the vehicle, when the vehicle is currently about to turn left; and
controlling the camera mounted under the right rear-view mirror to acquire an image for right rear of the vehicle, when the vehicle is currently about to turn right.

4. The method according to claim 1, wherein after the step of receiving the electrical signal detected by the detection module, the method further comprises following steps:
obtaining an extinction time of the electrical signal;
judging whether the extinction time of the electrical signal is longer than a preset time; and
controlling, if yes, the image acquisition module to stop acquiring an image for the rear of the vehicle in the current turning direction, and controlling the display module to shut down.

5. A device for controlling vehicle steering, wherein it is applicable to a vehicle-mounted controller, comprising: detection modules, an image acquisition module, and a display module, wherein the detection modules are provided at rubber hoses located between left and right vehicle doors and the vehicle body, and is configured as a detection module for detecting whether an electrical signal is present in a rubber hose, wherein the rubber hose is energized when the turn signal lamp in the vehicle is activated; and the device comprises:
a reception module configured to receive the electrical signal detected by the detection module;
a determination module configured to determine the current turning direction of the vehicle after receiving the electrical signal detected by the detection module;
a control module configured to control the image acquisition module to acquire an image for the rear of the vehicle in the current turning direction according to the current turning direction of the vehicle; and
a transmission module configured to send the image acquired by the image acquisition module to the display module, so as to display the image for the rear of the vehicle in the current turning direction for the driver to check.

6. The device according to claim 5,
wherein the detection module comprises a plurality of detectors, with the plurality of detectors being provided at the rubber hoses located between left and right vehicle doors and the vehicle body respectively, and the determination module is specifically configured to: determine that the vehicle is currently about to turn left, when a detector provided at the rubber hose located between the left vehicle door and the vehicle body detects an electrical signal; and determine that the vehicle is currently about to turn right, when a detector provided at the rubber hose located between the right vehicle door and the vehicle body detects an electrical signal;
the image acquisition module comprises a plurality of cameras, with the plurality of cameras being respectively mounted under the left and right rear-view mirrors of the vehicle, and the control module is configured to: control the camera mounted under the left rear-view mirror to acquire an image for the left rear of the vehicle, when the vehicle is currently about to turn left; and control the camera mounted under the right rear-view mirror to acquire an image for the right rear of the vehicle, when the vehicle is currently about to turn right.

7. The device according to claim 5, further comprising: an acquisition module and a judgment module, with the acquisition module being in connection with the reception module and the judgment module respectively, and the judgment module being in connection with the control module, wherein the acquisition module is configured to obtain an extinction time of the electrical signal;

the judgment module is configured to judge whether the extinction time of the electrical signal is longer than a preset time; and the control module is further configured to control the image acquisition module to stop acquiring an image for the rear of the vehicle in the current turning direction, if the extinction time of the electrical signal is longer than the preset time, and control the display module to shut down.

8. A vehicle-mounted controller, comprising: a detection module, an image acquisition module, a display module, a storage module, and a processing module, with the processing module being in connection with the detection module, the image acquisition module, the display module, and the storage module respectively, the storage module is configured to store a computer program executable in the processing module;

the detection module is provided at rubber hoses located between left and right vehicle doors and the vehicle body and configured to detect whether an electrical signal is present in a rubber hose, wherein the rubber hose is energized, when the turn signal lamp of the vehicle is activated;

the image acquisition module is configured to receive a control instruction from the processing module, and acquire an image for the rear of the vehicle in the current turning direction according to the control instruction;

the display module is configured to display the image for the rear of the vehicle in the current turning direction; and the processing module is configured to execute the computer program, hereby realizing the method according to claim 1.

9. The vehicle-mounted controller according to claim 8, wherein the detection module is provided on the rubber hose in a way of enwinding or clamping.

10. The vehicle-mounted controller according to claim 8, wherein the image acquisition module comprises a first camera and a second camera, the detection module comprises a first detector and a second detector, wherein the first camera is provided under the left rear-view mirror of the vehicle, the second camera is provided under the right rear-view mirror of the vehicle, the first detector is provided at a rubber hose located between a left vehicle door and the vehicle body, and the second detector is provided at a rubber hose located between a right vehicle door and the vehicle body; the first camera, the second camera, the first detector, and the second detector are respectively in electrical connection with the display module;

wherein the rubber hose located between the left vehicle door and the vehicle body is energized, when a left turn signal lamp of the vehicle is activated, and the first detector is configured to detect an electrical signal of the rubber hose; and when a right turn signal lamp of the vehicle is activated, the rubber hose located between the right vehicle door and the vehicle body is energized, and the second detector is configured to detect an electrical signal of the rubber hose;

the first detector, when detecting an electrical signal, sends the electrical signal to the display module; and the second detector, when detecting an electrical signal, sends the electrical signal to the display module;

when receiving the electrical signal sent by the first detector, the display module energizes the first camera, controls the first camera to acquire an image for the left rear of the vehicle, and displays the image acquired by the first camera; and when receiving the electrical signal sent by the second detector, the display module energizes the second camera, controls the second camera to acquire an image for the right rear of the vehicle, and displays the image acquired by the second camera.

11. The vehicle-mounted controller according to claim 10, wherein the display module stops powering the first camera and the second camera, when no electrical signal is received within a preset duration.

12. The vehicle-mounted controller according to claim 8, wherein the image acquisition module comprises a first camera and a second camera, the detection module comprises a first detector and a second detector, wherein the first camera is provided under the left rear-view mirror of the vehicle, the second camera is provided under the right rear-view mirror of the vehicle, the first detector is provided at a rubber hose located between a left vehicle door and the vehicle body, and the second detector is provided at a rubber hose located between a right vehicle door and the vehicle body;

the first camera and the second camera are respectively in electrical connection with the display module; and the first detector is in electrical connection with the first camera, and the second detector is in electrical connection with the second camera;

wherein the rubber hose located between the left vehicle door and the vehicle body is energized, when a left turn signal lamp of the vehicle is activated, and the first detector is configured to detect an electrical signal of the rubber hose; and when a right turn signal lamp of the vehicle is activated, the rubber hose located between the right vehicle door and the vehicle body is energized, and the second detector is configured to detect an electrical signal of the rubber hose;

the first detector, when detecting an electrical signal, sends the electrical signal to the first camera; the first camera, when receiving the electrical signal sent by the first detector, acquires an image for the left rear of the vehicle and sends the acquired image to the display module; and the second detector, when detecting an electrical signal, sends the electrical signal to the second camera; the second camera, when receiving the electrical signal sent by the second detector, acquires an image for the right rear of the vehicle and sends the acquired image to the display module.

13. The vehicle-mounted controller according to claim 12, wherein the first camera stops acquiring an image, when no electrical signal is received within a preset duration; and the second camera stops acquiring an image, when no electrical signal is received within a preset duration.

14. The vehicle-mounted controller according to claim 13, wherein the display module is automatically activated, when a video signal is detected, and displays the image corresponding to the video signal; and the display module is automatically shut down, when no video signal is detected within the preset duration.

15. The method according to claim 2, wherein after the step of receiving the electrical signal detected by the detection module, the method further comprises following steps:

obtaining an extinction time of the electrical signal;

judging whether the extinction time of the electrical signal is longer than a preset time; and controlling, if yes, the image acquisition module to stop acquiring an image for the rear of the vehicle in the current turning direction, and controlling the display module to shut down.

16. The method according to claim 3, wherein after the step of receiving the electrical signal detected by the detection module, the method further comprises following steps:
obtaining an extinction time of the electrical signal;
judging whether the extinction time of the electrical signal is longer than a preset time; and
controlling, if yes, the image acquisition module to stop acquiring an image for the rear of the vehicle in the current turning direction, and controlling the display module to shut down.

17. The device according to claim 6, further comprising: an acquisition module and a judgment module, with the acquisition module being in connection with the reception module and the judgment module respectively, and the judgment module being in connection with the control module,
wherein the acquisition module is configured to obtain an extinction time of the electrical signal;
the judgment module is configured to judge whether the extinction time of the electrical signal is longer than a preset time; and
the control module is further configured to control the image acquisition module to stop acquiring an image for the rear of the vehicle in the current turning direction, if the extinction time of the electrical signal is longer than the preset time, and control the display module to shut down.

* * * * *